L. A. HAMEL.
TOOTH BRUSH.
APPLICATION FILED MAY 25, 1915.
1,172,792.
Patented Feb. 22, 1916.
2 SHEETS—SHEET 1.
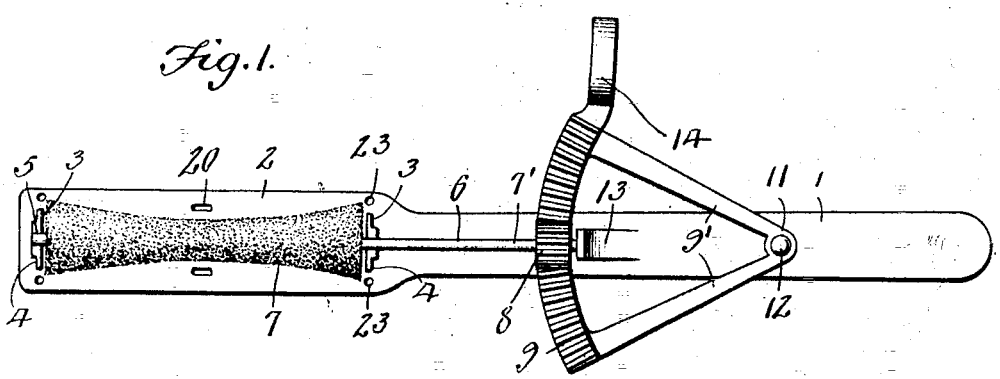
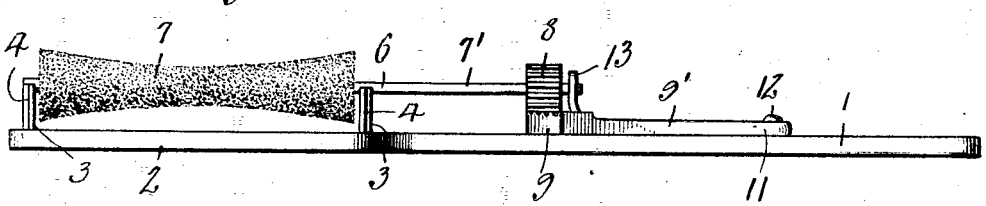
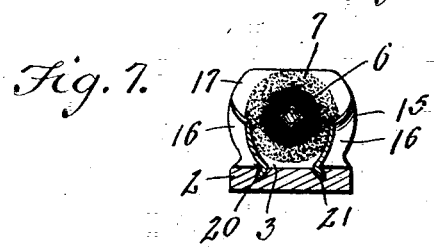
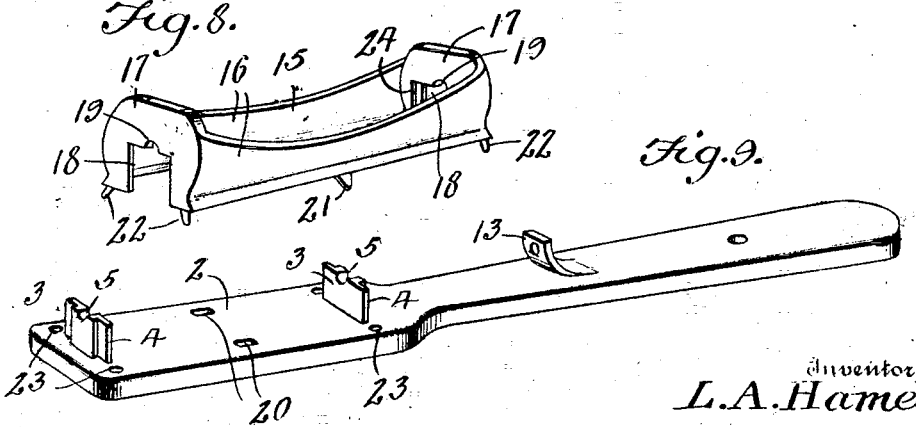
Inventor
L. A. Hamel,
By Victor J. Evans
Attorney
Witness

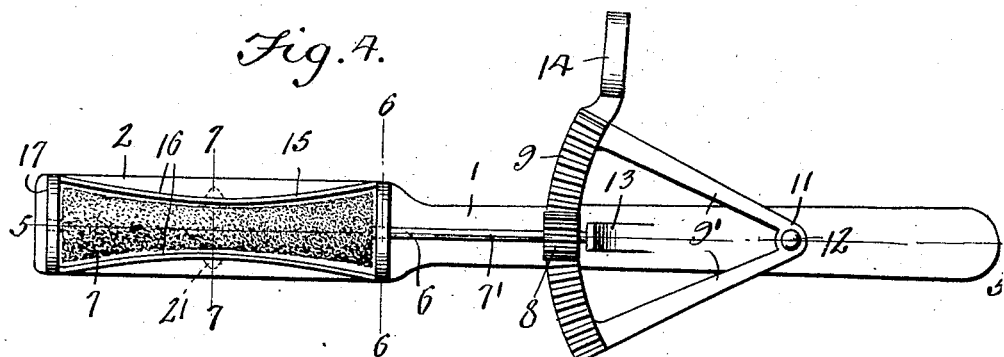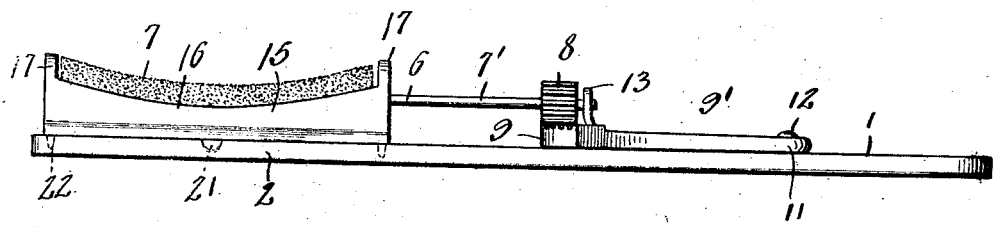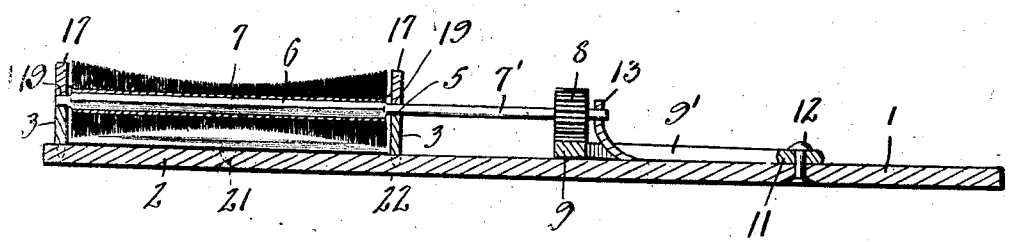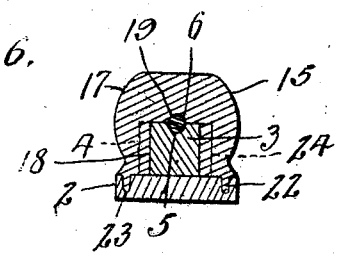

UNITED STATES PATENT OFFICE.

LEO A. HAMEL, OF BROOKLYN, NEW YORK.

TOOTH-BRUSH.

Specification of Letters Patent. Patented Feb. 22, 1916.

Application filed May 25, 1915. Serial No. 30,397.

*To all whom it may concern:*

Be it known that I, LEO A. HAMEL, a citizen of the United States, residing at Brooklyn, in the county of Kings and State of New York, have invented new and useful Improvements in Tooth-Brushes, of which the following is a specification.

The present invention relates to tooth brushes, and one of the objects of the invention is to provide a rotatable brush and means conveniently arranged upon the handle for rotating the said brush.

A further object of the invention is to provide a handle with a removable rotary brush, and a casing or protector for the brush.

A still further object of the invention is to provide a handle with a removable rotary brush, a casing providing a protector for the sides of the brush, means for detachably securing the casing to the handle and whereby the said casing will serve the additional purpose of retaining the shaft of the brush within the bearings.

With the above and other objects in view, the improvement resides in the construction, combination and arrangement of parts set forth in the following specification and falling within the scope of the appended claim.

In the drawings: Figure 1 is a top plan view of a rotary brush constructed in accordance with the present invention, the protector or casing being removed, Fig. 2 is a side elevation of the same, Fig. 3 is a similar elevation with the protector in position, Fig. 4 is a top plan view of the device illustrated in Fig. 3, Fig. 5 is a longitudinal sectional view on the line 5—5 of Fig. 4, Fig. 6 is a transverse sectional view on the line 6—6 of Fig. 4, Fig. 7 is a similar section on the line 7—7 of Fig. 4, Fig. 8 is a perspective view of the protector detached, and Fig. 9 is a similar view of the handle.

Referring now to the drawings in detail, the numeral 1 designates the handle of my improved construction of tooth brushes, the same being preferably of the usual rectangular formation and, of course, of the desired size including a widened bristle receiving portion or head which in the present instance is indicated by the numeral 2. The head 2 is provided with a pair of spaced brackets 3—3, each of which is disposed at a right angle to the head proper. The brackets 3 have their outer longitudinal edges recessed to provide the same with reduced portions forming tongues 4, and the outer ends of said brackets are centrally provided each with an approximately circular depression 5, the said depressions providing bearings for the shaft 6 of a rotary brush 7. The brush is preferably beveled, and the shaft 6 projects beyond the opposite ends of the said brush, one of the ends of the shaft projecting beyond the head 2 and over the handle 1, and the end of this projecting portion of the shaft, indicated for distinction by the reference character 7', has secured thereon a toothed wheel 8. The shaft except at its bearing portions may be rectangular so that the same may engage with the rectangular openings in the core of the brush, so that any number of brushes may be arranged upon the said shaft if desired.

The numeral 9 designates a toothed segment which is provided with spaced angularly disposed arms 9', the said arms having their outer ends connected to provide what may be termed a head 11 and the said head is pivotally secured to the handle, as at 12. A bracket 13 is provided, for the end of the portion 7' of the shaft, which is secured to the handle 1 between the arms while one of the ends of the toothed segment 9 is formed with a ring 14, the same adapted to be engaged by one of the fingers of the operator so that the segment may be swung upon its pivot 12 and so rotate the brush 7 in opposite directions.

The numeral 15 designates what I term a protector for the brush 7, the same comprising a casing having spring sides 16—16 and connecting ends 17—17. The ends 17 are centrally slotted and the inner walls or edges provided by the slots recessed, as at 18, and the lower and connecting wall provided by the said slots or cut-away portions are formed with semi-circular depressions 19. The walls provided by the opening 18 are spaced a distance away from each other equaling the width of the brackets 3—3, and the sides 16 of said casing 15 coincide with the shape of the brush 7. The tongues 4 are adapted to be received within the depressions 8 when the member 15 is arranged over and to the opposite sides of the brush.

The brush, of course, projects a suitable and desired distance between the spaced sides 16—16. In order to secure the member 15 upon the head 2, I provide the said head with centrally arranged angularly disposed spaced depressions 20, and I likewise form the sides 16 upon what may be termed their inner edges with centrally arranged angularly disposed spring tongues 21 which, when the sides are compressed or forced toward each other, are adapted to be inserted within the depressions 20 and when the sides are expanded, the angular tongues 21 will snugly engage within the angular walls provided by the depressions 20. Likewise I provide the corners of the member 15 with spring tongues 22—22 which are preferably rounded or inclined, as illustrated in the drawings, and I provide the head with depressions or recesses 23—23 which are adapted to receive the said tongues 22. It will be noted that when the member 15 is in position, the semi-circular depressions 19, in the ends 17 will contact with the portions of the shaft 6 projecting beyond the depressions 5 in the members 3. The tongues 4 of the members 3 will be received in depressions 24 provided upon the inner faces of the end members 17 arranged at the longitudinal walls provided by the slots 18.

To remove the member 15, it is merely necessary to compress the sides 16—16 to bring the tongues 21—21 out of the depressions or recesses 20 in the handle 2 and the spring tongues 22 being constructed as previously stated may be readily withdrawn from the depressions 23.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

A tooth brush including a handle, a pair of spaced brackets upon the handle, said brackets having their opposite edges reduced to provide the same with tongues, a handle provided with a pair of depressions disposed centrally between the brackets, the walls provided by the said depressions being angular, the said handle being further provided with depressions disposed adjacent each of the opposite sides of the brackets, said brackets having their upper edges depressed, a shaft journaled within the said depressions, a brush arranged upon the shaft between the brackets, means arranged upon the handle, for rotating the shaft, a protector casing for the brush comprising a member including spaced resilient sides formed with tongues that engage within the depressions central between the brackets of the handle, the said protector member having ends that are centrally cut-away and the end walls provided by the cut-away portions depressed, the inner edges of the ends provided by the cut-away portions being grooved to receive the tongues of the brackets and the referred to depressed portions contacting with the shaft, the corners of said member being provided with spring tongues and the said spring tongues adapted to enter the remaining openings in the handle.

In testimony whereof I affix my signature in presence of two witnesses.

LEO A. HAMEL.

Witnesses:
WILLIAM BERGIN,
FREDERICK REID.